H. F. SCHMIDT.
GEARING.
APPLICATION FILED APR. 24, 1918.
1,388,897.
Patented Aug. 30, 1921.
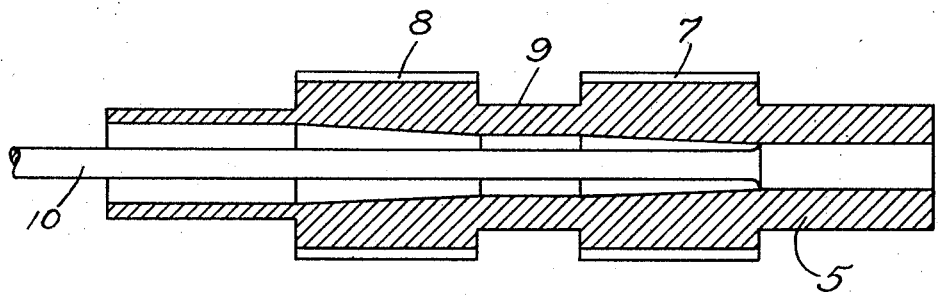
WITNESSES:
INVENTOR.
Henry F. Schmidt
BY
ATTORNEYS.

UNITED STATES PATENT OFFICE.

HENRY F. SCHMIDT, OF WILKINSBURG, PENNSYLVANIA, ASSIGNOR TO WESTINGHOUSE GEAR & DYNAMOMETER COMPANY, A CORPORATION OF PENNSYLVANIA.

GEARING.

1,388,897.  Specification of Letters Patent.  Patented Aug. 30, 1921.

Application filed April 24, 1918. Serial No. 230,450.

*To all whom it may concern:*

Be it known that I, HENRY F. SCHMIDT, a citizen of the United States, and a resident of Wilkinsburg, in the county of Allegheny and State of Pennsylvania, have made a new and useful Invention in Gearing, of which the following is a specification.

This invention relates to gearing and particularly to reduction gearing capable of transmitting large power.

An object of the invention is to produce a new and improved gearing in which the torsional deflection of the pinion or smaller gear varies at a uniform rate throughout the length of the gear.

A further object is to produce a new and improved gear or pinion which is so formed as to insure uniform loading of the gear teeth when the gear or pinion is transmitting power and is consequently subjected to torsional deflecting strains.

A further object is to produce a pinion or gear which is so formed that its moment of inertia varies at different points along its length so as to produce a constant deflection per unit of length when the gear is subjected to torsional or twisting strains.

These and other objects are attained by means of a gear or pinion embodying the features herein described and illustrated in the drawings accompanying and forming a part hereof.

Driving pinions of reduction gearing are ordinarily of relatively small diameter and particularly when compared to the driven gear with which they mesh. When such pinions are subjected to torsional or twisting strains they deflect, and inasmuch as the driven gear with which they mesh is usually materially larger and consequently more rigid, some means must be employed for compensating for the torsional deflection of the smaller gear or pinion in order that the tooth pressures may be maintained substantially uniform per unit of length of the pinion. The only successful method of accomplishing this result is to so mount the pinion that it is capable of moving to different angular positions relatively to the axis of the driven gear, when it deflects under torsional strains. This angular motion of the pinion compensates for the torsional distortion of its teeth and therefore tends to distribute tooth pressures uniformly across the faces of the intermeshing teeth. Where the pinion is so formed that its moment of inertia, about the axis of the pinion, is uniform throughout the length of the pinion, the torsional deflection varies from one end of the pinion to the other. This is particularly true when the driving force is transmitted to one end of the pinion, but it is also a well known fact that it occurs when the teeth of the pinion are subjected to uniform load per unit of length. In order to overcome the difficulty occasioned by a variation in the deflection throughout the length of the gear, I have so formed the pinion that its moment of inertia, about the axis of the pinion, is varied from one end of the pinion to the other, in such a way as to produce a uniform or constant deflection per unit of length of the pinion when the pinion is subjected to twisting or torsional strains.

In the drawings I have illustrated a sectional view of a pinion embodying my invention. As illustrated, the pinion consists of a tubular member 5, on which two sets of teeth 7 and 8 are formed. The separate sets of teeth may be separated by an intervening space 9, which, with the ends of the tubular member 5, may be employed as journals for the pinion. A flexible driving shaft 10 extends through the hollow interior of the member 5 and is rigidly secured to one end of the member at a point adjacent to one of the journal portions. The point of connection of the shaft 10 with the tubular member 5 may be termed the driving end of the pinion, and in the drawing I have illustrated the pinion so formed that its section is gradually reduced from the driving to the free end of the pinion. This reduction in section is accomplished by tapering the hole which extends through the pinion and occasions a reduction in the moment of inertia about the axis of the pinion from the driving to the free end thereof. The distribution of material throughout the length of the pinion is such that the moment of inertia varies from one end to the other so as to occasion a uniform torsional deflection when the pinion is subjected to torsional or twisting strains. This distribution of metal throughout the length of the pinion in effect weakens the free end of the pinion so that the deflection at this point is increased over that which would occur if the pinion were of uniform section from end to end. By a proper proportioning of the distribution of metal, I am able to obtain a uniform deflection from one end of the gear to the other when the gear teeth are subjected to uniform load per unit of length. As a result, the individual teeth instead of deflecting so as to present curved lines of contact to the intermeshing teeth of the more rigid driven gear, present straight lines of contact, and as a result an angular deflection of the supporting frame of the pinion will shift the pinion to such an angular position, with relation to the axis of the driven gear, that the tooth pressures throughout the length of the gear will be maintained absolutely uniform.

It will be obvious to those skilled in the art that my invention is particularly useful in connection with turbo-reduction gear installations. It is common practice to employ a floating frame in connection with the pinion member in such an installation and ordinarily the pinion member must have some form of flexible connection with the turbine shaft. Accordingly, I connect my pinion with a flexible shaft so that the pinion may move angularly in an axial plane to the necessary extent in order to present straight lines of pinion teeth in full contact with the gear teeth. Ordinarily, the journal portions outside of and between the pinion portions 7 and 8 would be carried in the bearings of a floating frame. The necessary flexibility having been provided between the axis of the pinion and the axis of the turbine by the means referred to, it then becomes necessary to so design the pinion portions that the torsional deflection, necessarily present due to the peculiarities of the structure adopted, is made uniform per unit of length along each pinion portion so that straight lines of contact along the pinion teeth will be preserved. Any change in the helix angle of the teeth will be compensated for by movement of the floating frame.

While I have described and illustrated but one embodiment of my invention, it will be apparent to those skilled in the art that various modifications, additions, changes, and omissions may be made in the apparatus illustrated without departing from the spirit and scope of the invention, as set forth by the appended claims.

What I claim is:

1. A tubular gear having a power connection portion and another portion adapted to be free of the driving connection and the mass of said last portion being so disposed that the moment of inertia decreases gradually outwardly from the connection portion whereby the gear may deflect uniformly per unit of length.

2. A gear comprising a tubular member having a power connection portion and a gear portion capable of torsional deflection relative to the power connection portion, the gear portion being tapered whereby upon deflection the teeth preserve straight lines of contact.

3. A gear comprising a tubular member having a power connection portion and a gear portion having teeth formed on the outer face thereof the latter portion being of decreasing radial thickness whereby the moment of inertia about the axis of the gear portion varies from one end to the other so as to produce a uniform deflection per unit of length and subjection of the teeth thereof to uniform load.

4. A driving pinion for a transmission gearing, comprising a tubular member having gear teeth on the outer face thereof and to which the driving force is transmitted to substantially one portion of the pinion, characterized by the fact that the metal of the pinion is so distributed lengthwise of the pinion that the moment of inertia about the axis thereof varies from the point of application of the driving force toward the free ends of the gearing so as to produce a uniform deflection per unit of length when the pinion is subjected to torsional or twisting strains.

5. A pinion comprising a tubular member adapted for connection at a single end to a power transmitting member and having two sets of teeth formed on the outer peripheral face thereof and spaced one from the other, the tubular portions having the teeth being tapered so that said portions may deflect uniformly per unit of length.

6. A pinion comprising a member having a plurality of sets of gear teeth formed on the peripheral surface thereof, and having an axial opening extending therethrough, said opening being tapered at points along the length thereof corresponding to the spacing of the sets of gear teeth.

7. Gearing comprising a hollow cylindrical member provided with teeth on the outer surface thereof and having a tapered hole extending therethrough, and a shaft having a driving connection with the gear at only one end of the gear.

8. Gearing comprising a hollow cylindrical member provided with teeth on the outer surface thereof and having a tapered hole terminating in a power connection portion and a shaft extending through the hole and having a driving connection with the gear at the power connection portion.

9. In gearing, the combination of a pinion member having journal and pinion portions and a flexible power transmitting member connected to the pinion member at one side of the pinion portions, the pinion portions having varying moments of inertia from end to end in order to secure uniform deflection thereof and preservation of the tooth lines in operation.

10. In gearing, the combination of a pinion member having a plurality of pinion portions and journal portions outside of and between the pinion portions and a flexible power transmitting member connected to the pinion member so as to allow of deflection of the pinion member in an axial plane relative to the power transmitting member and the pinion portions having their respective masses so distributed that the torsional deflection in each pinion portion takes place uniformly and the teeth thereof preserve their lines of contact.

In testimony whereof, I have hereunto subscribed my name this 22nd day of April, 1918.

HENRY F. SCHMIDT.

Witness:
C. W. McGHEE.